(12) United States Patent
Sunder et al.

(10) Patent No.: US 12,146,837 B2
(45) Date of Patent: Nov. 19, 2024

(54) PORTABLE INSPECTION, COLLECTION, AND DELIVERY APPARATUS FOR FLUID-BASED SYSTEMS

(71) Applicant: International Business Machines Corporation, Armonk, NY (US)

(72) Inventors: Madhana Sunder, Poughkeepsie, NY (US); Mary Ann Zaitz, Wappingers Falls, NY (US); Joyce E. Molinelli Acocella, Poughquag, NY (US); Michael J. Ellsworth, Jr., Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 304 days.

(21) Appl. No.: 17/805,488

(22) Filed: Jun. 6, 2022

(65) Prior Publication Data

US 2023/0393079 A1 Dec. 7, 2023

(51) Int. Cl.
*G01N 21/88* (2006.01)
*G01N 1/10* (2006.01)

(52) U.S. Cl.
CPC ............ *G01N 21/8803* (2013.01); *G01N 1/10* (2013.01)

(58) Field of Classification Search
CPC .............. G01N 1/10; G01N 2021/052; G01N 21/0317; G01N 21/05; G01N 21/29; G01N 21/85; G01N 21/8803; G01N 21/94
See application file for complete search history.

(56) References Cited

U.S. PATENT DOCUMENTS

| | | | |
|---|---|---|---|
| 3,581,085 A | * | 5/1971 | Barrett ............... G01N 33/1833 137/551 |
| 3,678,881 A | | 7/1972 | Shinn |
| 4,194,398 A | | 3/1980 | Gastrock |
| 6,116,274 A | | 9/2000 | Ehrlich |
| 9,970,903 B1 | | 5/2018 | Gerardi |

(Continued)

FOREIGN PATENT DOCUMENTS

JP 3534055 B2 * 6/2004

OTHER PUBLICATIONS

International Application No. PCT/IB2023/053164, Notification of Transmittal of the International Search Report and the Written Opinion, mailed Jun. 19, 2023, 13 pgs.

(Continued)

*Primary Examiner* — Andre J Allen
(74) *Attorney, Agent, or Firm* — Kimberly Zillig

(57) ABSTRACT

An apparatus used for analysis of a fluid-based system that includes a main chamber consisting of an optically transparent high strength material that ensures transmission of infrared and ultraviolet wavelengths and is capable of withstanding high pressures. The apparatus also includes first and second fluid tight endcaps attached to first and second ends of the main chamber, wherein the first endcap permits entry of a fluid into the main chamber and the second endcap permits the fluid to exit the main chamber. The apparatus further includes a fixed filter guide rail located inside the main chamber and attached to one of the end caps, and a filter located inside the main chamber and configured to removably attach to the fixed filter guide rail, wherein the filter is capable of capturing residue or contaminants in the fluid.

20 Claims, 11 Drawing Sheets

(56) References Cited

U.S. PATENT DOCUMENTS

| | | |
|---|---|---|
| 10,729,925 B1 | 8/2020 | Lomas |
| 2008/0009099 A1 | 1/2008 | Kishkovich |
| 2013/0008838 A1 | 1/2013 | Burke |
| 2013/0068673 A1* | 3/2013 | Maggiore ............ B01D 65/102 210/85 |
| 2014/0250835 A1 | 9/2014 | Prabhu |
| 2016/0305810 A1 | 10/2016 | Fitch |
| 2018/0005818 A1 | 1/2018 | Yu |
| 2020/0179947 A1 | 6/2020 | Weber |
| 2021/0181020 A1 | 6/2021 | McQuilkin |

OTHER PUBLICATIONS

15×15mm Super Small Brushless DC Fan Ultra Tiny Miniature Mini Micro Smallest Cooling fan DC5V 0.06A Raspberry Pi, https://www.aliexpress.com/item/32371533906.html. Retrieved from the internet on Mar. 22, 2022.

Black body radiation and color temperature, https://www.giangrandi.org/optics/blackbody/blackbody.shtml. Retrieved from the internet on Mar. 22, 2022.

CM Scientific—Sapphire & Ti:Sapphire Components, https://www.cmscientific.com/tisapphire.php. Retrieved from the Internet on Mar. 22, 2022.

Davidson, M.W., Tungsten-Halogen Incandescent Lamps, https://zeiss-campus.magnet.fsu.edu/print/lightsources/tungstenhalogen-print.html. Retrieved from the internet on Mar. 22, 2022.

Dutton, Jack (Sep. 5, 2014) How Sapphire, The Nearly Indestructible Material Now Being Used For Smartphones, Is Made, https://www.businessinsider.com/how-sapphire-glass-screens-are-made-2014-9. Retrieved from the internet in Mar. 22, 2022.

Glasatelier-Saillart—Available sizes of quartz tubes, tubes in quartz glass, https://glasatelier-saillart.be/en/kwartsglas/beschikbare-maten-buizen-kwartsglas/. Retrieved from the internet on Mar. 22, 2022.

Goodfellow Ceramic & Glass. (Sep. 10, 2019). Fused Silica/Quartz Glass—Properties and Applications of Fused Silica/Quartz Glass by Goodfellow Ceramic & Glass Division. AZoM. Retrieved on Mar. 22, 2022 from https://www.azom.com/article.aspx?ArticleID=4766.

Halogen Lamps—How They Work & History, Copyright 2015 Edison Tech Center, http://edisontechcenter.org/halogen.html. Retrieved from the internet on Mar. 22, 2022.

Hirose E, Sakakibara Y, Igarashi Y, Ishii T. Sapphire screws and strength test on them at liquid nitrogen temperature. Rev Sci Instrum. Oct. 2014;85(10):104503. doi: 10.1063/1.4898432. PMID: 25362427.

Iizuka, T., Fujimoto, H., & Ono, T. (1987). A new material (single crystal sapphire screw) for internal fixation of the mandibular ramus. Journal of Cranio-Maxillofacial Surgery, 15, 24-27. doi:10.1016/S1010-5182(87)80009-4.

Infrared Basics—IR Heating Equipment and Infrared Ovens by Protherm, LLC, https://www.pro-therm.com/infrared_basics.php. Retrieved from the internet on Mar. 22, 2022.

Karaki, Habib et al. (Feb. 27, 2014) Demystifying Thermopile IR Temp Sensors, https://www.fierceelectronics.com/components/demystifying-thermopile-ir-temp-sensors. Retrieved from the internet on Mar. 22, 2022.

Momentive Technologies—Mechnical Properties, https://www.momentivetech.com/properties-of-quartz/. Retrieved from the internet on Mar. 22, 2022.

Parker Fulflo © Metallic Filter Cartridges, http://hcwarner-filter.com/shop/pleated-filter-cartridges/parker-fulflo-metallic-filter-cartridges/. Retrieved from the internet on Mar. 22, 2022.

Quora—Can you drill a hole in a thin sapphire plate? What about a threaded hole? https://www.quora.com/Can-you-drill-a-hole-in-a-thin-sapphire-plate-What-about-a-threaded-hole. Retrieved from the internet on Mar. 22, 2022.

Rayotek—Specialty Shapes—Domes, Tubes, Prisms & Exotics, https://rayotek.com/glass_custom_dome_tube_rod_prism.htm. Retrieved from the internet on Mar. 22, 2022.

Sapphire Tubes Rods—EFG Sapphire Tubes Product Data Sheet, https://www.crystals.saint-gobain.com/synthetic-sapphire/sapphire-tubes-rods-pins#, Retrieved from the internet on Mar. 22, 2022.

Synthetic Sapphira vs. Glass, Fused Quartz & Silica—Transparent Materials Comparison. https://rayotek.com/tech-specs/material-comparisons.htm. Retrieved from the internet on Mar. 22, 2022.

UV Sapphire—Vacuum Viewports, https://schoonoverinc.com/high-vacuum-products/vacuum-viewports/viewports-sapphire/. Retrieve from the internet on Mar. 22, 2022.

Valley Design Corp.—Sapphire optical properties and Sapphire optical transmission, https://valleydesign.com/sapppic.htm. Retrieved from the internet on Mar. 22, 2022.

* cited by examiner

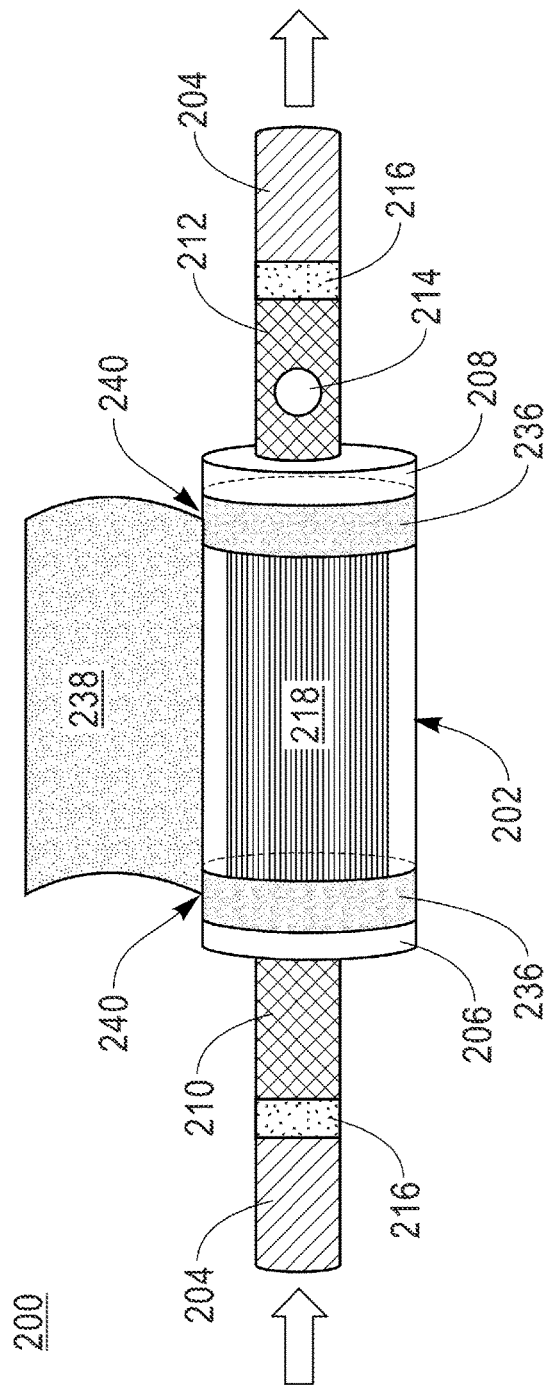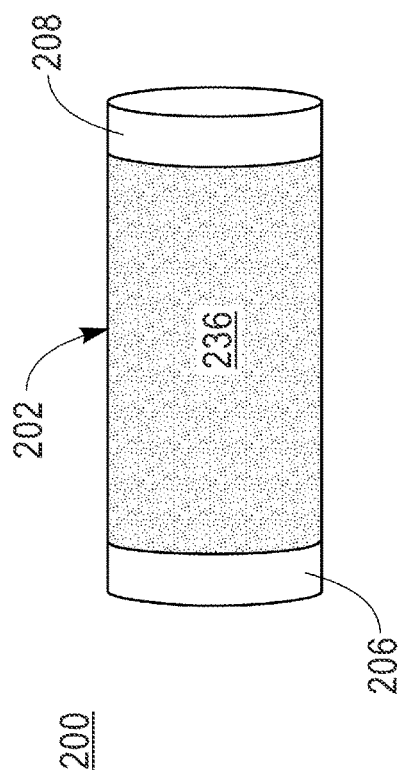

800

Providing an apparatus comprising: a main chamber; first and second fluid tight endcaps; a fixed fluid guide rail; and a removable filter.
810

Evaluating fluid in the apparatus from a fluid-based system.
820

Evaluating includes visually inspecting filter
830

Evaluating includes collecting a sample of fluid from system during operation
840

FIG. 12

PORTABLE INSPECTION, COLLECTION, AND DELIVERY APPARATUS FOR FLUID-BASED SYSTEMS

BACKGROUND

The present disclosure relates generally to monitoring a fluid-based system to determine a condition of fluid in the system and maximize equipment life, and more particularly to an apparatus to effectively enable visual inspection of captured residue and/or collection of fluid from the system for evaluation, without interrupting the functioning of the system.

Conventional methods of inspecting fluids of a machine include visual inspection of the fluid (e.g., dipsticks). These methods may not be practical and/or may have limited capabilities. For example, due to the configuration of some machines, it may be difficult to visually inspect the fluid.

SUMMARY

According to some embodiments of the disclosure, there is provided an apparatus used for analysis of a fluid-based system. The apparatus includes a main chamber consisting of an optically transparent high strength material that ensures transmission of infrared (IR) and ultraviolet (UV) wavelengths and is capable of withstanding high pressures. The apparatus also includes first and second fluid tight endcaps attached to first and second ends of the main chamber, wherein the first endcap permits entry of a fluid into the main chamber and the second endcap permits the fluid to exit the main chamber. The apparatus further includes a fixed filter guide rail located inside the main chamber and attached to one of the end caps, and a filter located inside the main chamber and configured to removably attach to the fixed filter guide rail, wherein the filter is capable of capturing residue or contaminants in the fluid. The apparatus is attached to tubing of the fluid-based system such that the fluid moves in the apparatus from the fluid-based system and out of the apparatus and into the fluid-based system.

According to some embodiments of the disclosure, there is provided a fluid-based system. The system includes a fluid loop including a fluid flowing therethrough, and an apparatus inserted within the loop and used for analysis of the fluid. The apparatus includes a main chamber consisting of an optically transparent high strength material that ensures transmission of IR and UV wavelengths and is capable of withstanding high pressures. The apparatus also includes first and second fluid tight endcaps attached to first and second ends of the main chamber, wherein the first endcap permits entry of a fluid into the main chamber and the second endcap permits the fluid to exit the main chamber. The apparatus further includes a fixed filter guide rail located inside the main chamber and attached to one of the end caps, and a filter located inside the main chamber and configured to removably attach to the fixed filter guide rail, wherein the filter is capable of capturing residue or contaminants in the fluid. The apparatus is attached to tubing of the fluid loop such that the fluid moves in the apparatus from the fluid loop and out of the apparatus and into the fluid loop.

According to some embodiments of the disclosure, there is provided a method of inspecting a fluid in a fluid-based system. The method includes operations of providing an apparatus, and evaluating the fluid in the apparatus. The apparatus includes a main chamber consisting of an optically transparent high strength material that ensures transmission of IR and UV wavelengths and is capable of withstanding high pressures. The apparatus also includes first and second fluid tight endcaps attached to first and second ends of the main chamber, wherein the first endcap permits entry of a fluid into the main chamber and the second endcap permits the fluid to exit the main chamber. The apparatus also includes a fixed filter guide rail located inside the main chamber and attached to one of the end caps, and a filter located inside the main chamber and configured to removably attach to the fixed filter guide rail, wherein the filter is capable of capturing residue or contaminants in the fluid. The apparatus is attached to tubing of the fluid-based system such that the fluid moves in the apparatus from the fluid-based system and out of the apparatus and into the fluid-based system.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

FIG. 5 is a top view of an apparatus, in accordance with embodiments of the disclosure.

FIG. 6 is a bottom view of a portion of the apparatus of FIG. 5, in accordance with embodiments of the disclosure.

FIG. 12 is a flow diagram of a method of inspecting a fluid in a fluid-based system.

Figure 1:
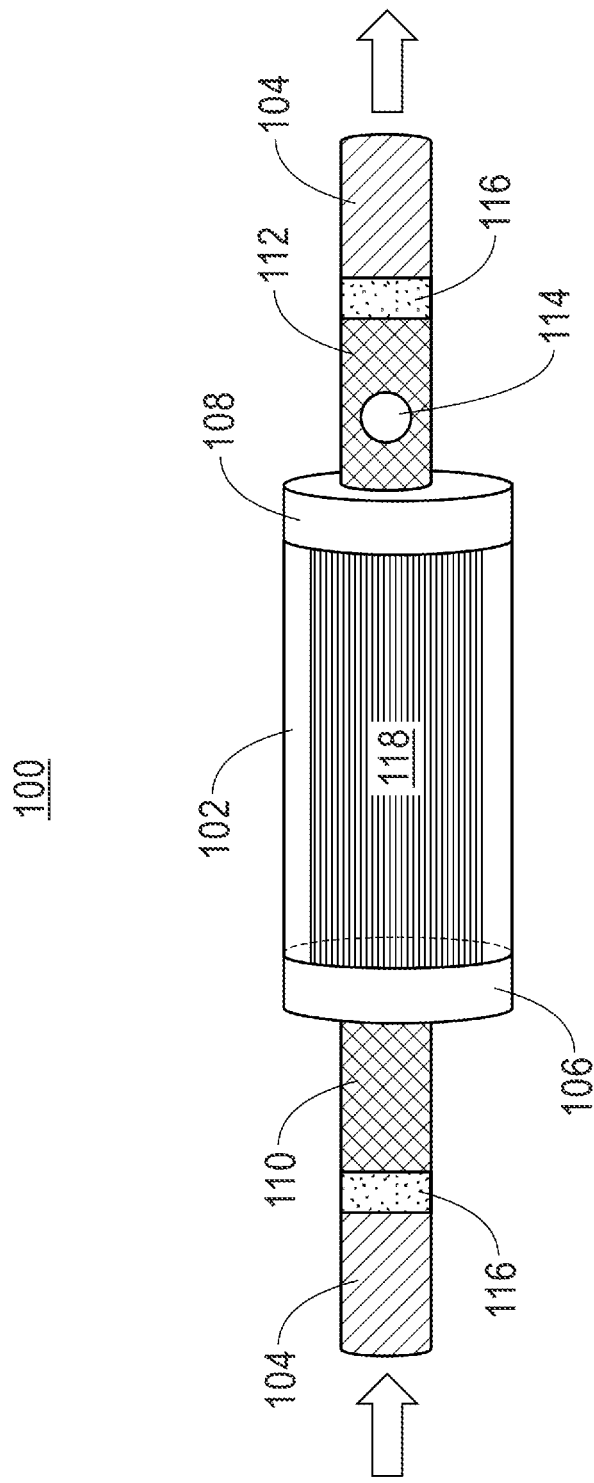
FIG. 1 is a top view of an apparatus, in accordance with embodiments of the disclosure.

While the disclosure is amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the spirit and scope of the disclosure.

DETAILED DESCRIPTION

Aspects of the present disclosure relates generally to monitoring a fluid-based system to determine a condition of fluid in the system and maximize equipment life, and more particularly to an apparatus to effectively enable visual inspection of captured residue and/or collection of fluid from the system for evaluation, without interrupting the functioning of the system. While the present disclosure is not necessarily limited to such applications, various aspects of the disclosure can be appreciated through a discussion of various examples using this context.

Hardware used in various devices such as chillers, fluid-cooled heating, ventilation, and air conditioning (HVAC) systems, high temperature thin film growth systems, etc., can be made up of non-transparent metallic, plastic, composite components, which prevents a simple visual or remote inspection of contaminants, if any, inside a closed or open loop. In addition, it is not trivial to sample buildup for failure analysis purposes as it involves removal of suspected hardware, which in turn could disrupt the loop and a system's functionality. In some instances, further examination of the suspected hardware can be required, and this can entail an ability to ship the hardware and its contents intact from a system site to an external failure analysis facility. Built-up residue from the loop preferably should be contained in its natural state inside the suspected hardware and sealed from outside environment during a removal or shipment process. In addition, the removal process of the suspected hardware should not affect the functioning of the loop in any shape or form. In some cases, it can be necessary to examine the chemistry of the fluid used in the loop, and this too can necessitate a means to transport the fluid intact from the system site to an external failure analysis/chemistry facility located at another geographic location.

Embodiments of the present disclosure relate to an apparatus to effectively enable visual inspection of captured residue and process fluid found in a closed or open fluid loop pertaining to commonly used devices such as oil-based cooling systems, water chillers, high temperature thin film deposition systems, fluid-cooled HVAC systems, etc., without interrupting the functioning of the loop components. It can also enable entrapment and shipment of contents, intact, from the loop to a vendor site and vice-versa, for analysis of chemical make-up of buildup or fluid. The apparatus can also be capable of emulating heat load produced by certain hardware elements of the loop on a micro-loop or offline test environment.

The disclosed apparatus can utilize orientation-controlled insertable filters for capturing buildup or contaminants. The filters can be viewed in order to identify possibly contaminants. In addition, the apparatus can be easily removable from the loop or system, which can allow for shipment of built-up residue and fluid samples within the apparatus, without exposure to the external environment, to a laboratory or other facility for evaluation of any such residue or fluid samples.

It can be desired to protect the fluid in the loop from exposure to light coming from the external environment. Other features of the disclosed apparatus can include a non-transparent jacket configured to prevent entry of light into the apparatus when not in use. A hinged flap/cover can be included in the apparatus in order to selectively view the filters inside. In addition, the apparatus can be equipped with regular light-emitting diode (LED) lights for aiding visual inspection of the filter. The apparatus can also include a thermal heater assembly capable of maintaining the temperature of the removable filter at a desired set value, that is, higher than the ambient temperature of the fluid flowing through the loop. This feature can emulate the heat load faced by certain hardware elements of the loop in a micro-loop or offline test environment.

One feature or advantage of disclosed apparatuses and processes is an ability to monitor and sample fluid in a loop for water/fluid quality prior to hook up of hardware to the loop. This feature can protect hardware from potential damage from contaminated fluid, for example. Another feature or advantage of the disclosed apparatuses and processes is an ability to capture samples of fluid with potential contaminants from the loop without interrupting the functioning of the loop. Another feature or advantage is the ability for quick identification of contaminants in the loop. A further feature and advantage of the disclosed apparatuses and processes is the apparatus can emulate the heat load faced by certain hardware elements of the loop. Yet another feature or advantage of the disclosed apparatuses and processes is effective viewing and inspection of a filter in the apparatus that can retain possible contaminants in the loop.

Turning to the figures, FIG. 1 is a top view of an apparatus 100 for fluid-based systems. Arrows are included in the figure that show a direction of fluid flow through the apparatus 100 in an open or closed fluid loop. The apparatus 100 can be a reusable, portable, inspection, collection and/or delivery apparatus for fluid-based systems.

The apparatus 100 can include a main chamber 102 that can be cylindrical in shape, although other suitable shapes are also contemplated. The main chamber 102 can be made up of a transparent high strength material capable of withstanding high pressures, such as ultraviolet (UV) grade fused silica, UV grade sapphire or other suitable material. The main chamber 102 can consist of an optically transparent high strength material that also ensures transmission of IR and UV wavelengths and that is capable of withstanding high pressures. A diameter of the main chamber 102 can be equal to or greater than a diameter of tubing or piping 104 used in the fluid loop adjacent the apparatus 100.

The apparatus 100 can include a first endcap 106 and a second endcap 108 on opposite ends of the main chamber 102. The first endcap 106 can be located on the in-flow side (or fluid-in end) of the main chamber 102 and the second endcap 108 can be located on the out-flow side (or fluid-out end) of the main chamber 102. The endcaps 106, 108 can be fluid tight. The endcaps 106, 108 can permit entry of fluid into and out of the main chamber 102. The end caps 106, 108 can be removable from the main chamber 102. In another embodiment, the fluid-out endcap, i.e., the second endcap 108, can be permanently attached to the fluid-out end of the main chamber 102. The first and second endcaps 106, 108 can either include or be attached to first and second endcap piping portions 110, 112, respectively. The second endcap piping portion 112 can include a fluid collection spout 114, for example. Other suitable locations for the fluid collection spout 114 are, however, also contemplated. The fluid collection spout 114 can be used to take samples of fluid running through the loop for evaluation of contaminants, etc. The fluid collection spout 114 can enable quick removal of the fluid from the loop for inspection during operation. Additionally, or alternatively, the apparatus can include quick disconnects 116 adjacent the first and second endcaps 106, 108 that can connect the endcaps 106, 108 to the fluid loop. The quick disconnects 116 are configured to allow for easy removal of the apparatus 100 from the fluid loop in order to evaluate/test the contents of the apparatus 100 (such as contaminants).

A removable filter 114 is shown inside the main chamber 102. The filter 114 can be designed to simulate certain aspects, such as materials, shapes, dimensions, etc., of the fluid loop where contaminant accumulation or residue build-up can be more prevalent. In one embodiment, the filter 110 can consist of a series of metallic pleats running along the length of the filter 110. If there are contaminants in the fluid loop, they can be caught in the filter 114 and either visually identified or identified by further testing or evaluation.

Figure 2:
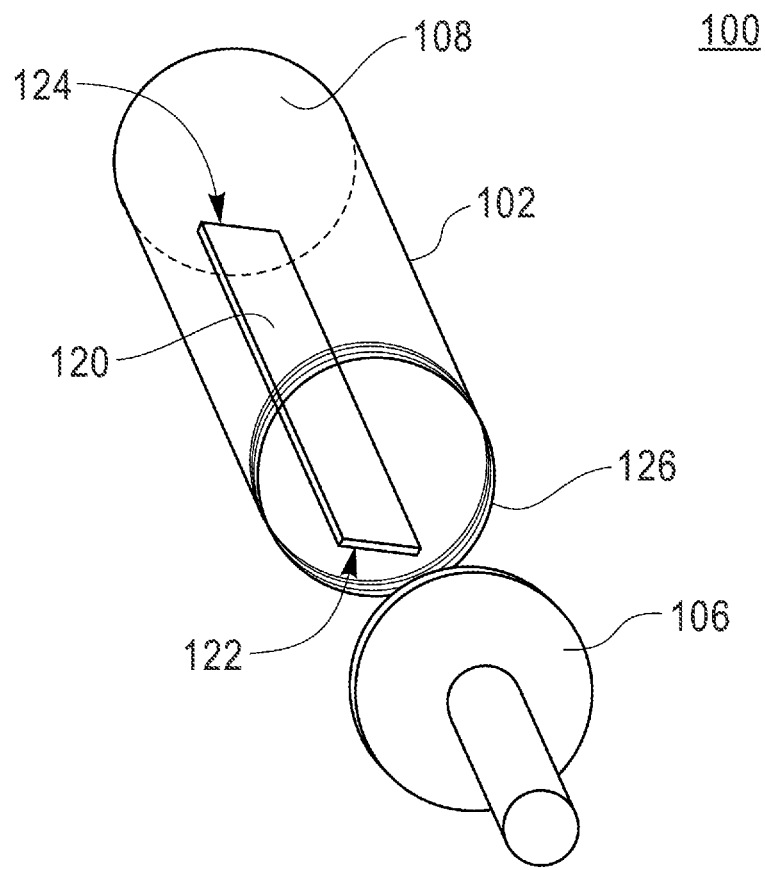
FIG. 2 is a perspective view of a portion of the apparatus of FIG. 1, in accordance with embodiments of the disclosure.

The orientation of the filter 114 in the main chamber 102 can be controlled by a guide rail 120, as shown in FIG. 2. FIG. 2 is a perspective view of a portion of the filter apparatus 100 of FIG. 1. The first endcap 106 is shown removed in order to access a first end 122 of the guide rail 120 to allow the filter 118 (not shown) to be loaded in or removed from the apparatus 100. A second end 124 of the guide rail 120 can be permanently or securely attached to an inside surface of the second endcap 108. FIG. 2 also shows threads 126 on main chamber 102 that can be used to removably attach and detach the first endcap 106 from the main chamber 102. Other suitable attachment means are also contemplated.

The filter 118 can be positioned in an upright position in the main chamber 102, such that filter surfaces, where contaminants can accumulate, are clearly visible to a viewer's eyes through the main chamber 102, from a top view, for example, as in FIG. 1. If a pleated-type filter is used, the long side of the pleats can be positioned parallel to the viewer's eyes, as shown in FIG. 1.

Figure 3:
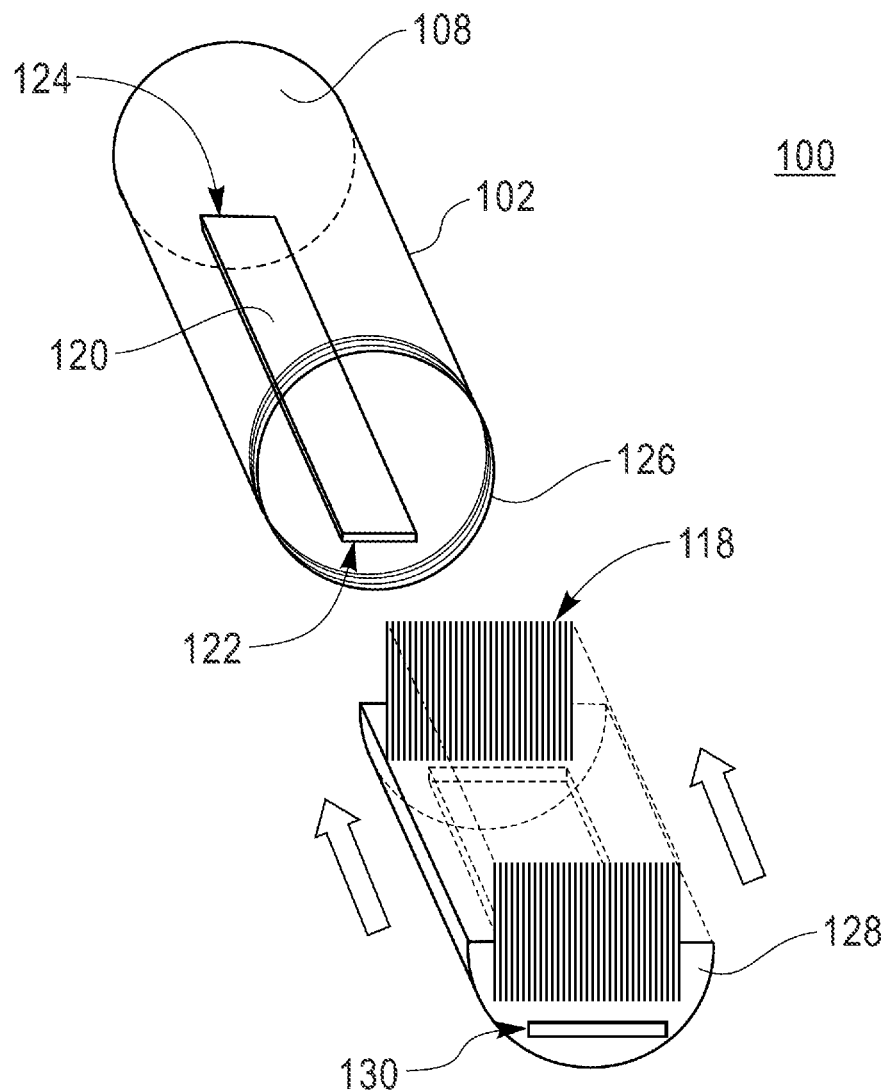
FIG. 3 is a perspective view of a portion of the apparatus of FIGS. 1-2, illustrating certain components in ghost outline, in accordance with embodiments of the disclosure.

FIG. 3 is a perspective view of a portion of the filter apparatus of FIGS. 1-2, illustrating certain components in ghost outline. The removable filter 118 can be attached as shown to a base portion 128 that can be shaped to correspond to a cylindrical outline of an inner surface of the main chamber 102. The removable filter 118 with the base portion 128 can be slid into the main chamber 102 along the guide rail 120 as shown by the arrows in the figure. The guide rail 120 can be used for reinsertion of the removable filter 118 into the main chamber 102. In particular, as shown, the base portion 128, with the filter 118 attached, can be loaded into the main chamber 102 by aligning and inserting the guide rail 120 within a rectangular-shaped, lengthwise opening 130 in the base portion 128. Other suitable guide rail and base opening shapes and configurations are also contemplated. Some additional purposes of the guide rail configuration can be to hold the filter 118 in a desired orientation for filtration and viewing of contents, and also to allow for easy removal and replacement of the filter 118 in the apparatus 100.

In one embodiment, the filter 118 can be removably attached to the base portion 128. The base portion 128 can, therefore, be removed and reinserted in order to exchange filters 118 in the apparatus 100 as needed. In another embodiment, the filter 118 can be permanently attached to the base portion 128. The removable filter 128 provided can include the base portion 128.

In one embodiment, the base portion 128 of the filter 118 can consist of a bulk solid piece. In another embodiment, the filter 118 can be held suspended between the ends of the base portion 128 such that the bottom portion of the filter 118 (i.e., opposite to the viewing side) cannot be covered by the base portion 128.

Figure 4:
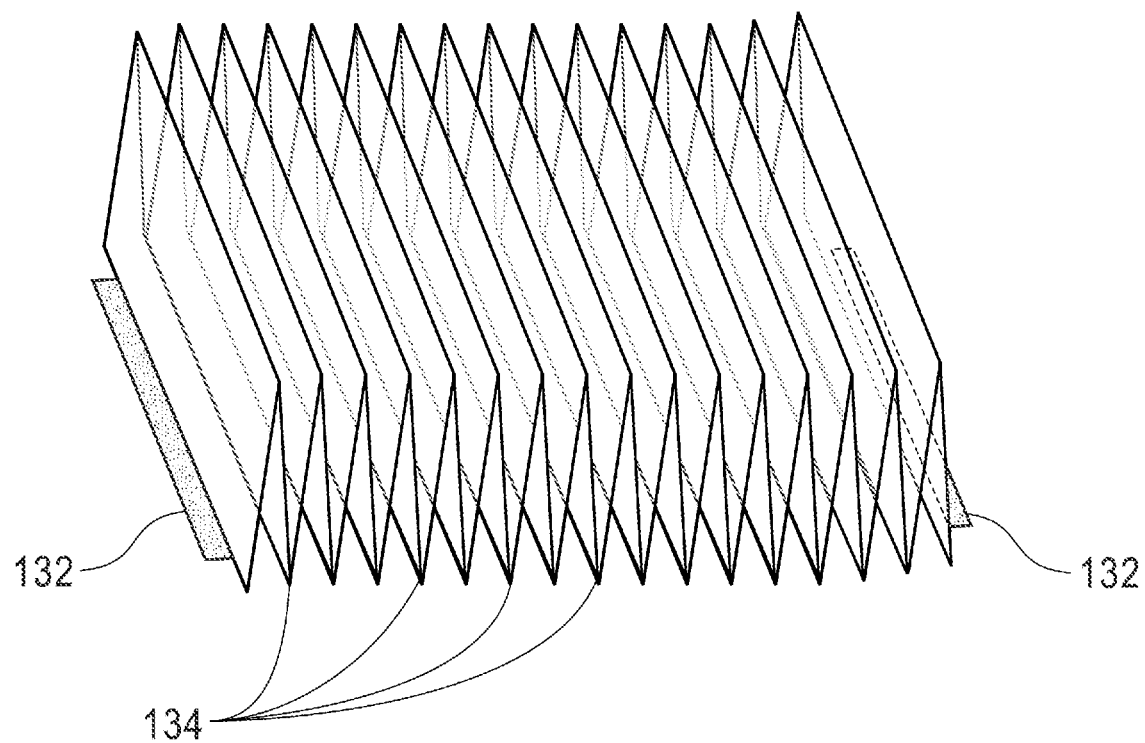
FIG. 4 is a perspective view of a filter portion of the apparatus of FIG. 1, in accordance with embodiments of the disclosure.

FIG. 4 illustrates an embodiment of the pleated filter 118, which includes insertion tabs 132. The filter 110 can be inserted onto the filter base portion 128 using the insertion tabs 132. A series of removable metallic pleated filters 134, having a fixed lateral spacing between the individual pleats 134, can be made available as a standard set for the apparatus 100. The fixed lateral spacing can range from a few microns to hundreds of microns. The range of possible lateral spacings can be exchanged one for the other depending on an application of interest. In another embodiment, a single filter 118 can have a varying array of lateral spacings between the individual pleats 134. The design (including lateral spacings) and placement of the filter 114 can be such that the filter 114 will not be restrictive enough to cause a pressure drop in the fluid loop.

FIG. 5 shows another embodiment of an apparatus 200. The apparatus 200 can include a cylindrical main chamber 202, like the main chamber 102 in the apparatus 100 discussed above. Features described above with regard to features of apparatus 100 generally apply to the corresponding features in the apparatus 200 that are numbered accordingly with a first number of "2" replacing the first number of "1" in the reference numerals. For example, the apparatus 200 also includes first and second endcaps 206, 208, that can either include or be attached to first and second endcap piping portions 210, 212, respectively. The second endcap piping portion 212 can include a fluid collection spout 214, for example. The apparatus 200 can include quick disconnects 216 adjacent the first and second endcaps 206, 208 that connect the endcaps 206, 208 to the main fluid loop.

An additional feature of the apparatus 200, not in the apparatus 100, is a cylindrical jacket 236 with a hinged flap/cover 238. The hinged flap/cover 238, when open, can provide a view inside the main chamber 202. A purpose of the cylindrical jacket 236 can be to prevent entry of light from a surrounding, external environment into the main chamber 202 when not in use. The cylindrical jacket 236 can be made up of a non-transparent (or opaque), flexible, yet robust, material such as rubber, hard plastic that can be positioned firmly against the main chamber 202 and possibly the first endcap 206 and the second end cap 208. The hinged flap/cover 238 can be connected to the main chamber 202 using at least two attachment points 240. In another embodiment, the hinged flap/cover 238 can be attached to a cylindrical metal bar (not shown) that can extend along an upper surface of the main chamber 202. The bar can, in turn, be connected to the ends of the cylindrical jacket 236. The hinged flap/cover 238 can be opened and closed for carrying out a visual inspection of a filter 218 or other devices located inside the main chamber 202. The hinged flap/cover 238 can be spring-loaded in order to return it to a closed position.

FIG. 6 is a bottom view of a portion of the apparatus 200 of FIG. 5. A portion of the opaque cylindrical jacket 236 can extend over the top half or portion of the main chamber 202 (as shown in FIG. 5). The cylindrical jacket 236 can also encompass or cover at least the bottom portion or half of the main chamber 202, as shown in FIG. 6. The cylindrical jacket 236 can prevent entry of light into the main chamber 202.

Figure 7:
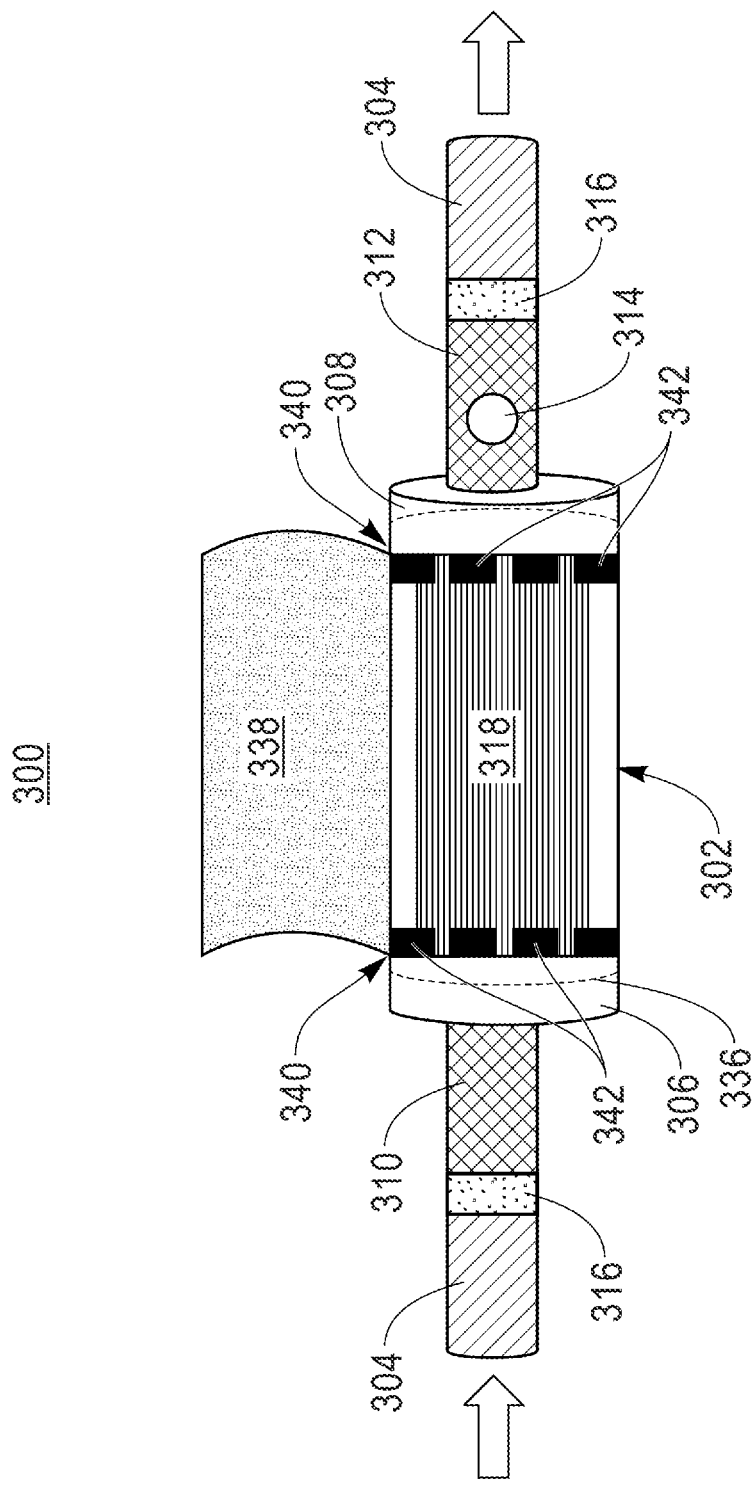
FIG. 7 is a top view of an apparatus, in accordance with embodiments of the disclosure.

FIG. 7 shows another embodiment of an apparatus 300. The apparatus 300 can include a cylindrical main chamber 302, like the main chambers 102, and 202 in the apparatuses 100 and 200, respectively, discussed above. Features described above with regard to features of apparatuses 100 and 200 generally apply to corresponding features in the apparatus 300 (with a "3" as the first number in the reference numeral rather than a "1" or "2"). For example, the apparatus 300 includes first and second endcaps 306, 308, that can either include or be attached to first and second endcap piping portions 310, 312, respectively. The second endcap piping portion 312 can include a fluid collection spout 314. Additionally, or alternatively, the apparatus 300 can include quick disconnects 316 adjacent the first and second endcaps 306, 308.

An additional feature of the apparatus 300, not shown in the apparatuses 100 and 200, can include one or more LED lights 342 to aid in visual inspection of a filter 318 located inside the main chamber 302. The LED lights 342 can be attached to a bottom (or inner) surface of the cylindrical jacket 336 that can overlap a top portion of the main chamber 302. The LED lights 342 can be designed to automatically turn on when a hinged flap/cover 338 is opened for visual inspection and can turn off when the hinged flap/cover 338 is closed. The LED lights 342 can be arranged on both sides of an opening in the main chamber 302 resulting when the hinged flap/cover 338 is open. Other suitable numbers and arrangements of the LED lights 342 are also contemplated by the disclosure.

Figure 8:
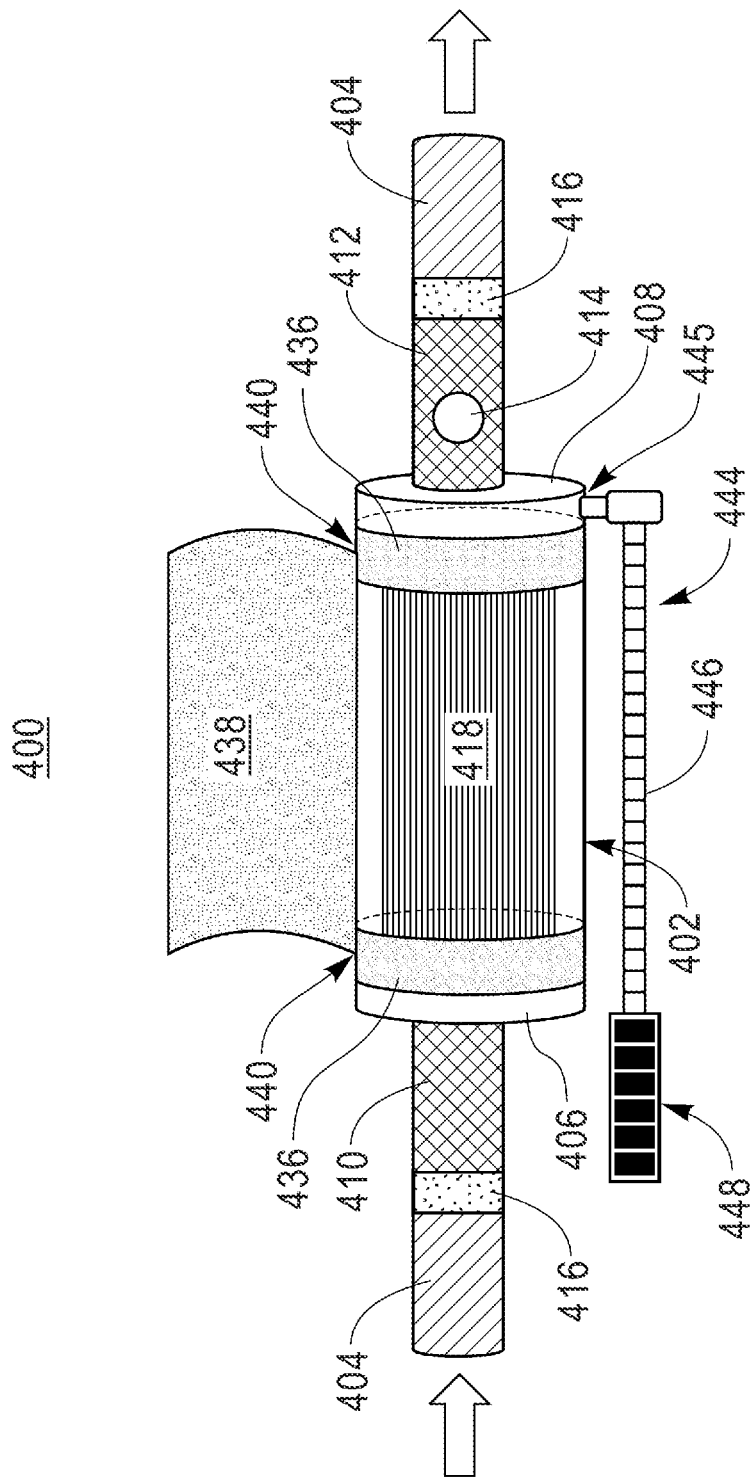
FIG. 8 is a top view of an apparatus, in accordance with embodiments of the disclosure.

FIG. 8 shows another embodiment of an apparatus 400. The apparatus 400 can include a cylindrical main chamber 402, like the main chambers 102, 202, and 302 in the apparatuses 100, 200 and 300, respectively, discussed above. Features described above with regard to features of apparatuses 100, 200 and 300 generally apply to corresponding features in the apparatus 400 (with a "4" as the first number in the reference numeral rather than a "1," "2," or "3"). For example, the apparatus 400 includes first and second endcaps 406, 408, that can either include or be attached to first and second endcap piping portions 410, 412, respectively. The second endcap piping portion 412 can include a fluid collection spout 414, for example. Additionally, or alternatively, the apparatus 400 can include quick disconnects 416 adjacent the first and second endcaps 406, 408.

An additional feature of the apparatus 400, not shown in the apparatuses 100, 200 and 300, can be a flexible goose neck LED light assembly 444 attached to an exterior of the second endcap 408, for example. Other locations for attachment of the flexible goose neck LED light assembly 444, however, are also contemplated. The flexible goose neck LED assembly 444 can include a flexible goose neck arm 446 and a plurality of LED lights 448 located on or near a free end of the flexible goose neck LED assembly 444. The flexible goose neck arm 446 can rotate or move about its attachment point 445 to the second endcap 408, for example. The flexible goose neck LED assembly 444 can be utilized for visual inspection of a filter 418 inside the main chamber 402.

Alternatively, inspection of the filters in the disclosed apparatuses can be carried out using ambient lighting or an external light source that can be held by a viewer, for example. In yet another embodiment, LED lights producing wavelengths other than the visible range can be adapted for additional functions. In a further embodiment, which is not shown, LED lights can be both attached to the cylindrical jacket (as in FIG. 7) and located on a flexible goose neck LED assembly (as in FIG. 8). Such an apparatus can be a combination of both of the embodiments of FIGS. 7 and 8, which can be utilized for filter inspection purposes.

Figure 9:
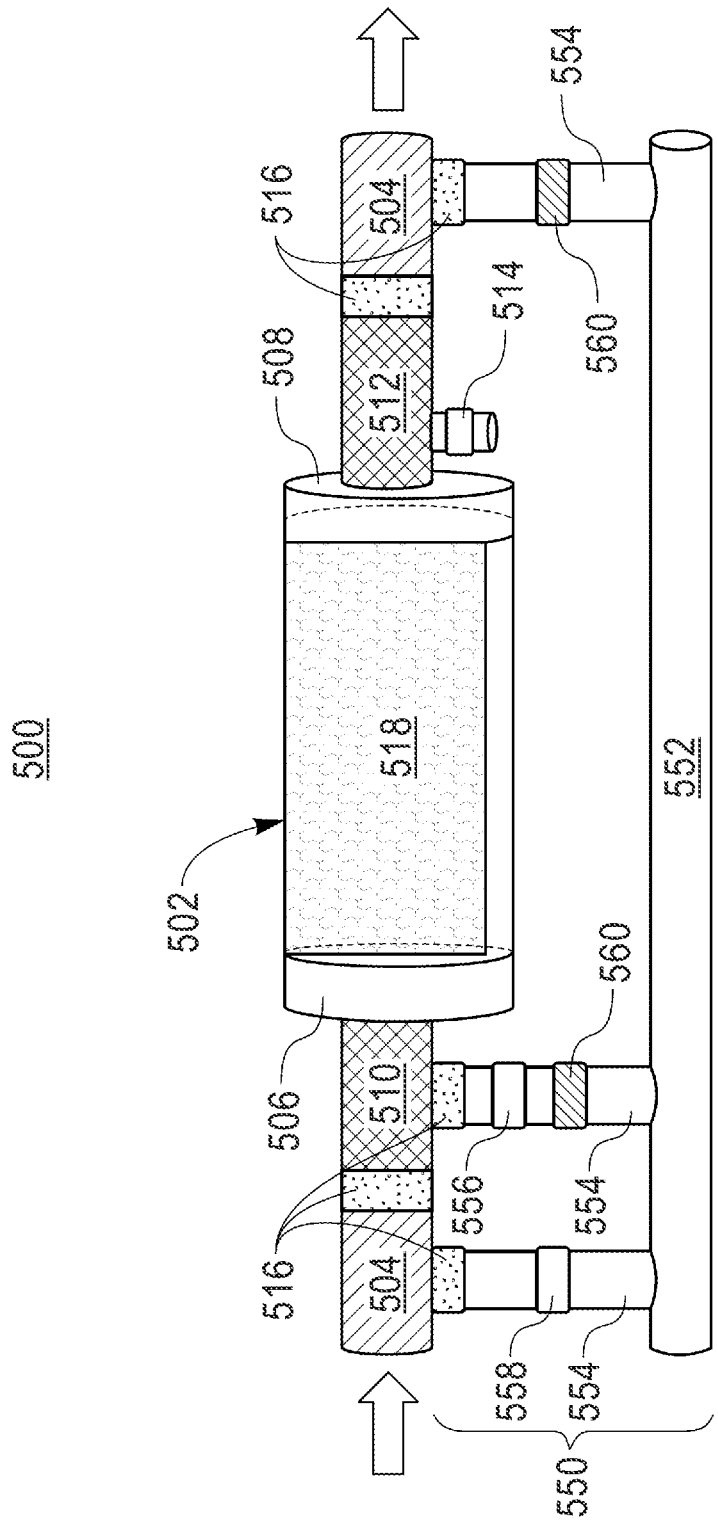
FIG. 9 is a side view of an apparatus, in accordance with embodiments of the disclosure.

FIG. 9 shows yet another embodiment of an apparatus 500. The apparatus 500 can include a cylindrical main chamber 502, like the main chambers 102, 202, 302 and 402 in the apparatuses 100, 200, 300 and 400, respectively, discussed above. Features described above with regard to features of apparatuses 100, 200, 300 and 400 generally apply to corresponding features in the apparatus 500 (with a "5" as the first number in the reference numeral rather than a "1," "2," "3," or "4"). For example, the apparatus 500 also includes first and second endcaps 506, 508, that can either include or be attached to first and second endcap piping portions 510, 512, respectively. The second endcap piping portion 512 can include a fluid collection spout 514, for example. The apparatus 500 can also include other features that are not shown, but are included in other embodiments disclosed herein, such as a cylindrical jacket, a hinged flap/cover and LED lights, etc.

An additional feature of the apparatus 500, not shown in the apparatuses 100, 200, 300 and 400, can include a bypass assembly 550 that can enable flow continuity in case of apparatus failure, while also permitting easy removal of the apparatus 500 from a fluid loop. The bypass assembly 550 can consist of a bypass line 552, multiple flow paths 554 (three (3) are shown), a pressure relief valve 556, an isolation valve 558, check valves 560 and quick disconnects 516 positioned in a specific manner. The isolation valve 558 can permit flow of fluid back to the fluid loop when the main chamber 502 is not in use. It can be operated either manually or remotely. The pressure relief valve 556 can also be utilized to permit fluid to enter the bypass line 552 and exit back to the fluid loop in case of an excess pressure build up in the main chamber 502. The check valves 560 can permit flow of fluid into the bypass line 552 and back out to the fluid loop in a specific direction or path. In addition, alert features such as sound and light, etc., can be present and utilized following activation of the pressure relief valve 556. Other suitable configurations and components of the embodiment including a bypass assembly are also contemplated.

Figure 10A:
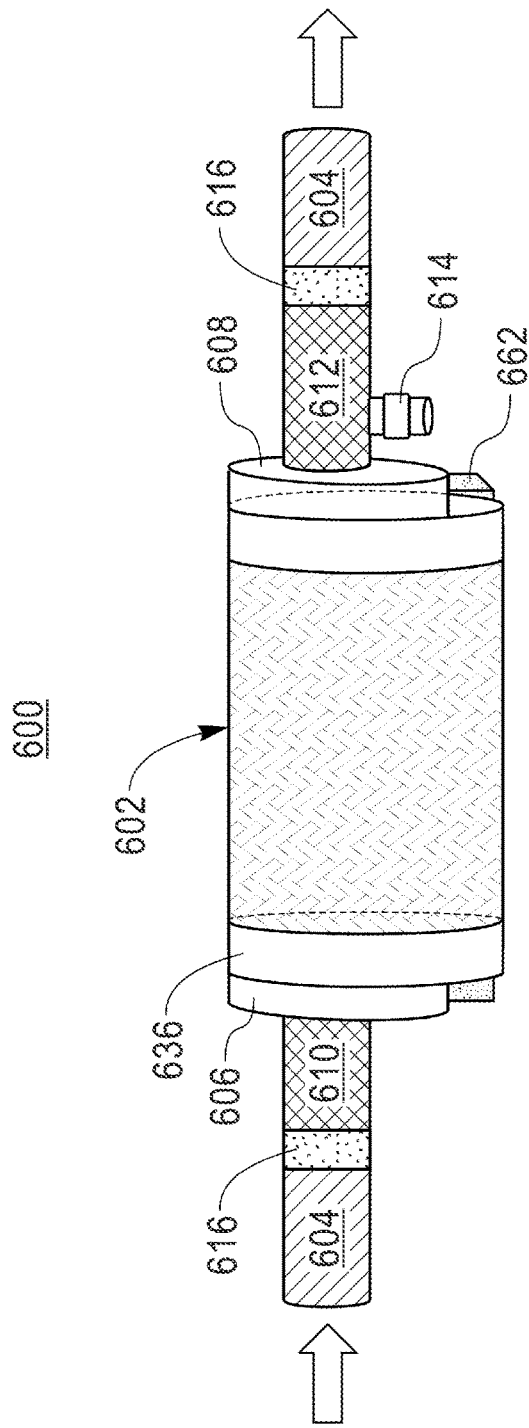
FIG. 10A is a side view of an apparatus, in accordance with embodiments of the disclosure.

FIG. 10A shows another embodiment of an apparatus 600. The apparatus 600 can include a cylindrical main chamber 602, like the main chambers 102, 202, 302, 402 and 502 in the apparatuses 100, 200, 300, 400 and 500, respectively, discussed above. Features described above with regard to features of apparatuses 100, 200, 300, 400 and 500 generally apply to corresponding features in the apparatus 600 (with a "6" as the first number in the reference numeral rather than a "1," "2," "3," "4," or "5"). For example, the apparatus 600 includes first and second endcaps 606, 608, that can either include or be attached to first and second endcap piping portions 610, 612, respectively. The second endcap piping portion 612 can include a fluid collection spout 614, for example. Additionally, or alternatively, the apparatus 600 can include quick disconnects 616 adjacent the first and second endcaps 606, 608. The apparatus 600 can also include other features, such as a hinged flap/cover (not shown), etc.

An additional feature of the apparatus 600, not shown in the apparatuses 100, 200, 300, 400 and 500, can include a thermal heater assembly 662 capable of maintaining the temperature of a removable filter (not visible in FIG. 10, but located inside main chamber 602) at a desired set value that is higher than ambient temperature of fluid flowing through a loop. This design feature can emulate a heat load produced by certain hardware elements of the loop in a micro-loop or offline test environment. The heater assembly 662 can be located adjacent a bottom portion of the main chamber 602. A cylindrical jacket 636 can surround the main chamber 602 and the heater assembly 662, as shown.

The heater assembly 662 can utilize a radiative heat transfer mechanism for controlling the temperature of the removable filter. For optimum use, it can be desirable to use a removable filter comprising of metallic pleats or one having a metallic base, etc. The radiative heat transfer mechanism of the heater assembly 662 can, for example, consist of any of the following: halogen lamps, incandescent light bulbs, IR LED devices, etc.

Figure 10C:
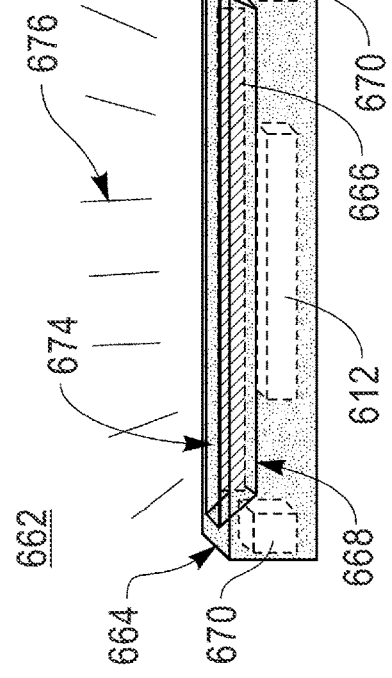
FIG. 10C is a side view of a thermal heater assembly of the apparatus of FIG. 10A illustrating certain portions in ghost outline, in accordance with embodiments of the disclosure.
Figure 10B:
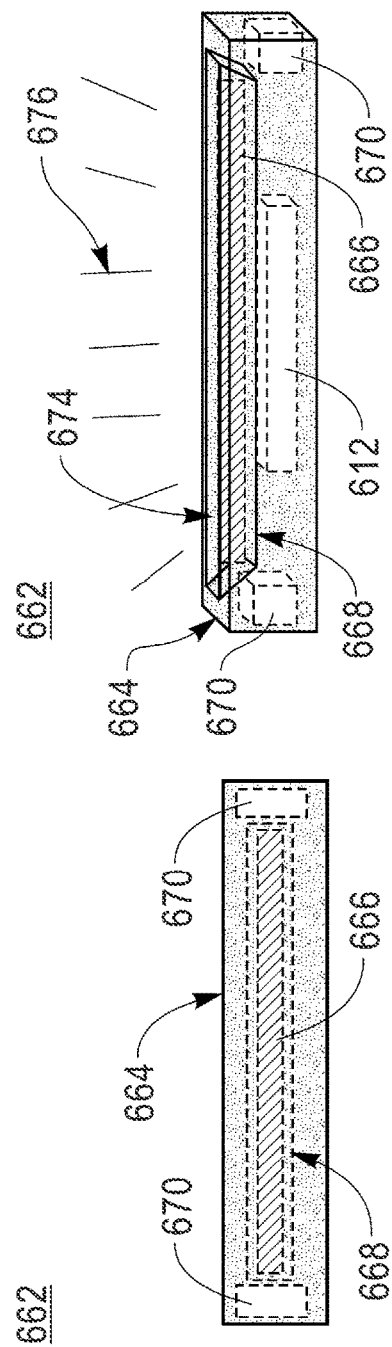
FIG. 10B is a top view of a thermal heater assembly of the apparatus of FIG. 10A illustrating certain portions in ghost outline, in accordance with embodiments of the disclosure.

As shown in views of the heater assembly 662, in FIGS. 10B-C, the heat transfer mechanism can be a double-ended tubular halogen lamp 666 in a lamp housing 664. An aluminum reflector 668 can surround at least a portion of the lamp 666, which can focus the heat in a direction towards the removable filter. The aluminum reflector 668 can have an opening 674 on the side adjacent the removable filter in the apparatus 600 in order to direct the heat towards the removable filter. IR waves 676 are shown in FIG. 10C radiating from lamp 666 and through the opening in the aluminum reflector 668.

The heater assembly 662 can further include one or more miniature fans 670 that can pull air in one end and push air out the other end of the lamp housing 664. In addition, the heater assembly 662 can include a heat sink 672 located adjacent the lamp 666, particularly below the lamp 666, which is located on an opposite side of the heater assembly 662 from the removable filter.

Figure 11:
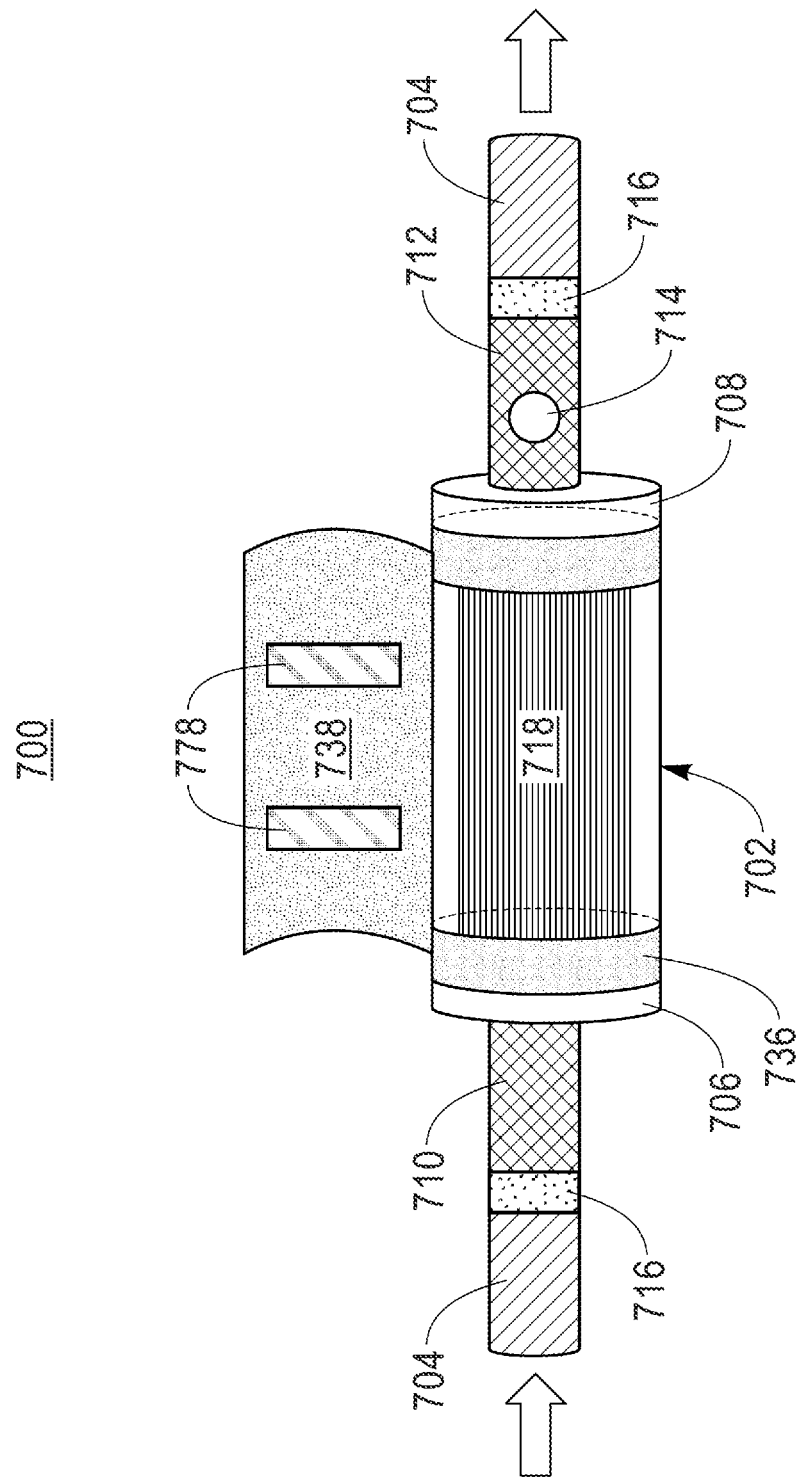
FIG. 11 is a top view of an apparatus, in accordance with embodiments of the disclosure.

FIG. 11 shows another embodiment of an apparatus 700. The apparatus 700 can include a cylindrical main chamber 702, like the main chambers 102, 202, 302, 402, 502 and 602 in the apparatuses 100, 200, 300, 400, 500 and 600, respectively, discussed above. Features described above with regard to features of apparatuses 100, 200, 300, 400, 500 and 600 generally apply to corresponding features in the apparatus 700 (with a "7" as the first number in the reference numeral rather than a "1," "2," "3," "4," "5," or "6"). For example, the apparatus 700 includes first and second endcaps 706, 708, that can either include or be attached to first and second endcap piping portions 710, 712, respectively. The second endcap piping portion 712 can include a fluid collection spout 714, for example. Additionally, or alternatively, the apparatus 700 can include quick disconnects 716 adjacent the first and second endcaps 706, 708. The apparatus 700 can also include other features, such as a cylindrical jacket 736, a hinged flap/cover 738, etc.

An additional feature of the apparatus 700, not shown in the apparatuses 100, 200, 300, 400, 500 and 600, can include flexible or rigid IR sensors 778 can be attached across from an IR source (not shown), such as that in the embodiment of FIG. 10A. One embodiment can be to attach the IR sensors 778 to an inner surface of the hinged flap/cover 738. The IR sensors 778 can sense the temperature of the removable filter 718 indirectly using emitted IR radiation.

The IR source (such as 566 in FIG. 10B) and IR sensor(s) (such as 778 in FIG. 11) can be placed on opposite sides of the main chamber 702 in order for actuation and detection to occur. One embodiment of the IR source can be a lamp unit that generates required IR radiation and can be attached to a bottom surface of the main chamber 702, such that an output side of the lamp unit can face a bottom portion of the removable filter 718. In another embodiment, a resistive heating mechanism can be utilized. Cooling fans, passive cooling, and heat sinks, etc. can also be utilized to cool the heater assembly.

A controller unit (not shown) can interface between the lamp unit (such as 666 in FIG. 10B) and the IR sensors (such as 778 in FIG. 11). It allows a user to enter a set value, and utilizes controls for raising or powering temperature using a user-specified ramp rate. The controller unit can be operated either manually or remotely.

The material making up the main chamber 702 can be capable of transferring IR heat without undergoing any degradation. Some example materials include UV grade fused silica, UV grade sapphire and other materials that are transparent to IR radiation. The material can, for example, withstand operating temperatures as high as 500 degrees Celsius, which can be required for constructing the main chamber 702.

FIG. 12 illustrate a flow diagram of an embodiment of a method or process 800 of inspecting a fluid in a fluid-based system. An operation of the method 800 is shown in FIG. 12 with reference numeral 810, and involves providing an apparatus described in the present disclosure. For example, the apparatus can comprise: a main chamber consisting of a transparent high strength material capable of withstanding high pressures; first and second fluid tight endcaps attached to first and second ends of the main chamber, wherein the first endcap permits entry of a fluid into the main chamber and the second endcap permits the fluid to exit the main chamber; a fixed filter guide rail located inside the main chamber and attached to one of the end caps; and, a filter located inside the main chamber and configured to removably attach to the fixed filter guide rail, wherein the filter is capable of capturing residue or contaminants in the fluid, and wherein the apparatus is attached to tubing of the fluid-based system such that the fluid moves in the apparatus from the fluid-based system and out of the apparatus back into the fluid-based system.

Another operation of the method 800 in FIG. 12 is indicated by reference numeral 820 and is evaluating the fluid in the apparatus, with the apparatus being in a fluid-based system. An additional operation of the method 800 is indicated by reference numeral 830 and can be the evaluating step including visually inspecting the filter for possible residue or contaminants of the fluid-based system. Yet another possible operation is indicated by reference numeral 840 and can be the evaluating step including collecting a sample of the fluid from the fluid-based system for inspection during operation of the fluid-based system. The process or method 800 can also include other operations that are addressed in the disclosure relating to the various embodiments of the apparatus and features of those embodiments.

For purposes of description herein, the terms "upper," "lower," "top," "bottom," "left," "right," "rear," "front," "vertical," "horizontal," and derivatives thereof shall relate to the devices as oriented in the figures. However, it is to be understood that the devices can assume various alternative orientations and step sequences, except where expressly specified to the contrary. It is also to be understood that the specific devices and processes illustrated in the attached drawings, and described in the following disclosure, are simply exemplary embodiments of the inventive concepts defined in the appended claims. Hence, other physical characteristics relating to the embodiments disclosed herein are not to be considered as limiting, unless the claims expressly state otherwise.

For purposes of this description, certain aspects, advantages, and novel features of the embodiments of this disclosure are described herein. The disclosed processes, and systems should not be construed as being limiting in any way. Instead, the present disclosure is directed toward all novel and nonobvious features and aspects of the various disclosed embodiments, alone and in various combinations and sub-combinations with one another. The processes, and systems are not limited to any specific aspect or feature or combination thereof, nor do the disclosed embodiments require that any one or more specific advantages be present, or problems be solved.

Although the operations of some of the disclosed embodiments are described in a particular, sequential order for convenient presentation, it should be understood that this manner of description encompasses rearrangement, unless a particular ordering is required by specific language set forth below. For example, operations described sequentially can in some cases be rearranged or performed concurrently. Moreover, for the sake of simplicity, the attached figures may not show the various ways in which the disclosed processes can be used in conjunction with other processes. Additionally, the description sometimes uses terms like "provide" or "achieve" to describe the disclosed processes. These terms are high-level abstractions of the actual operations that are performed. The actual operations that correspond to these terms can vary depending on the particular implementation and are readily discernible by one of ordinary skill in the art.

As used in this application and in the claims, the singular forms "a," "an," and "the" include the plural forms unless the context clearly dictates otherwise. Additionally, the term "includes" means "comprises."

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. An apparatus used for analysis of a fluid-based system, comprising:
   a main chamber consisting of an optically transparent high strength material that ensures transmission of infrared and ultraviolet wavelengths and is configured to withstand high pressures;
   first and second fluid tight endcaps attached to first and second ends of the main chamber, wherein the first endcap permits entry of a fluid into the main chamber and the second endcap permits the fluid to exit the main chamber;
   a fixed filter guide rail located inside the main chamber and attached to one of the end caps; and
   a filter located inside the main chamber and configured to removably attach to the fixed filter guide rail, wherein the filter is configured to capture residue or contaminants in the fluid,
   wherein the apparatus is attached to tubing of the fluid-based system such that the fluid moves in the apparatus from the fluid-based system and out of the apparatus and into the fluid-based system.

2. The apparatus of claim 1, further comprising:
   a fluid collection spout configured to allow collection of a sample of the fluid from the fluid-based system for inspection during operation of the fluid-based system.

3. The apparatus of claim 1, further comprising:
   a cover on at least a portion of the main chamber that is configured to open to allow for visual inspection of the filter inside the main chamber.

4. The apparatus of claim 1, further comprising:
   a non-transparent jacket surrounding at least a portion of the main chamber and configured to prevent entry of light into the main chamber.

5. The apparatus of claim 1, further comprising:
   at least one light source configured to aid in visual inspection of the filter located inside the main chamber for the presence of residue or contaminants.

6. The apparatus of claim 5, wherein the at least one light source includes a plurality of light-emitting diodes located adjacent the main chamber.

7. The apparatus of claim 5, wherein the at least one light source includes a plurality of light-emitting diodes located on a flexible arm that is configured to move adjacent the filter.

8. The apparatus of claim 1, further comprising:
   a bypass assembly including a bypass line including first and second ends, wherein the first end of the bypass line is connected to the tubing of the fluid-based system that is located at a first end of the apparatus where the fluid moves into the apparatus from the fluid-based system and the second end of the bypass line is connected to the tubing of the fluid-based system that is located at a second end of the apparatus where the fluid moves out of the apparatus and into the fluid-based system, and wherein the bypass assembly is configured to enable flow continuity of the fluid through the fluid-based system in case of apparatus failure.

9. The apparatus of claim 1, further comprising:
   a heater assembly located adjacent the filter and configured to maintain a temperature of the filter at a desired set value that is higher than ambient temperature of the fluid moving through the fluid-based system.

10. A fluid-based system comprising:
    a fluid loop including a fluid flowing therethrough; and
    an apparatus inserted within the loop and used for analysis of the fluid, comprising:
       a main chamber consisting of an optically transparent high strength material that ensures transmission of infrared and ultraviolet wavelengths and is configured to withstand high pressures;
       first and second fluid tight endcaps attached to first and second ends of the main chamber, wherein the first endcap permits entry of a fluid into the main chamber and the second endcap permits the fluid to exit the main chamber;
       a fixed filter guide rail located inside the main chamber and attached to one of the end caps; and
       a filter located inside the main chamber and configured to removably attach to the fixed filter guide rail, wherein the filter is configured to capture residue or contaminants in the fluid,
       wherein the apparatus is attached to tubing of the fluid loop such that the fluid moves in the apparatus from the fluid loop and out of the apparatus and into the fluid loop.

11. The system of claim 10, wherein the apparatus further comprises:
    a fluid collection spout configured to allow collection of a sample of the fluid from the fluid-based system for inspection during operation of the fluid-based system.

12. The system of claim 10, wherein the apparatus further comprises:
    a cover on at least a portion of the main chamber that is configured to open to allow for visual inspection of the filter inside the main chamber; and
    a non-transparent jacket surrounding at least a portion of the main chamber and configured to prevent entry of light into the main chamber.

13. The system of claim 10, wherein the apparatus further comprises:

at least one light source configured to aid in visual inspection of the filter located inside the main chamber for the presence of residue or contaminants.

14. The system of claim 13, wherein the at least one light source includes a plurality of light-emitting diodes located adjacent the main chamber.

15. The system of claim 13, wherein the at least one light source includes a plurality of light-emitting diodes located on a flexible arm that is configured to move adjacent the filter.

16. The system of claim 10, wherein the apparatus further comprises:
a bypass assembly including a bypass line including first and second ends, wherein the first end of the bypass line is connected to the tubing of the fluid-based system that is located at a first end of the apparatus where the fluid moves into the apparatus from the fluid-based system and the second end of the bypass line is connected to the tubing of the fluid-based system that is located at a second end of the apparatus where the fluid moves out of the apparatus and into the fluid-based system, and wherein the bypass assembly is configured to enable flow continuity of the fluid through the fluid-based system in case of apparatus failure.

17. The system of claim 10, wherein the apparatus further comprises:
a heater assembly located adjacent the filter and configured to maintain a temperature of the filter at a desired set value that is higher than ambient temperature of the fluid moving through the fluid-based system.

18. A method of inspecting a fluid in a fluid-based system, the method comprising:
providing an apparatus comprising:
a main chamber consisting of an optically transparent high strength material that ensures transmission of infrared and ultraviolet wavelengths and is configured to withstand high pressures;
first and second fluid tight endcaps attached to first and second ends of the main chamber, wherein the first endcap permits entry of a fluid into the main chamber and the second endcap permits the fluid to exit the main chamber;
a fixed filter guide rail located inside the main chamber and attached to one of the end caps; and
a filter located inside the main chamber and configured to removably attach to the fixed filter guide rail, wherein the filter is configured to capture residue or contaminants in the fluid,
wherein the apparatus is attached to tubing of the fluid-based system such that the fluid moves in the apparatus from the fluid-based system and out of the apparatus and into the fluid-based system; and
evaluating the fluid in the apparatus.

19. The method of claim 18, wherein the evaluating step includes visually inspecting the filter for possible residue or contaminants of the fluid-based system.

20. The method of claim 18, wherein the evaluating step includes collecting a sample of the fluid from the fluid-based system for inspection during operation of the fluid-based system.

* * * * *